H. L. DIETCHER.
LAWN SPRINKLER.
APPLICATION FILED AUG. 31, 1908.
974,954.
Patented Nov. 8, 1910.
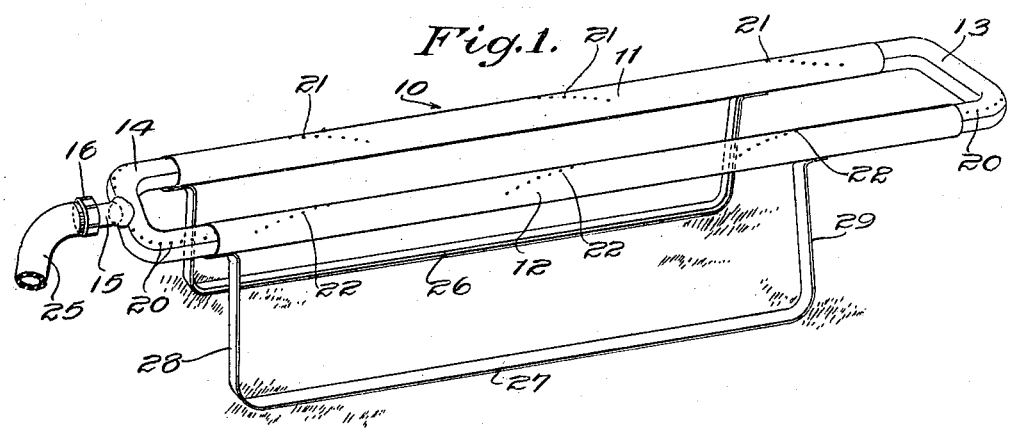
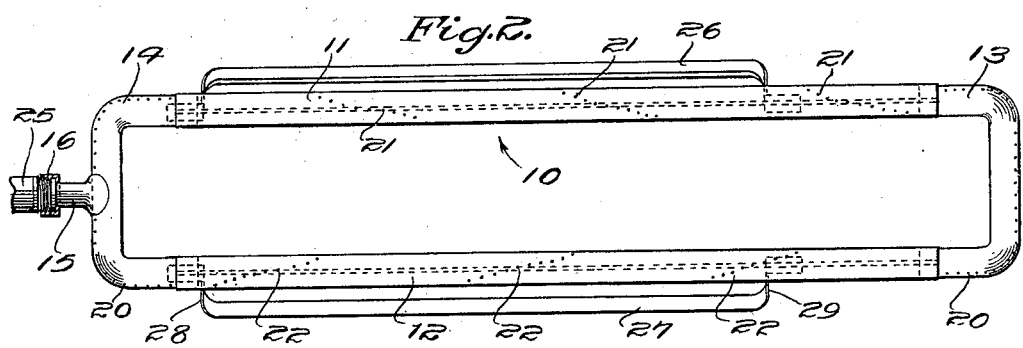
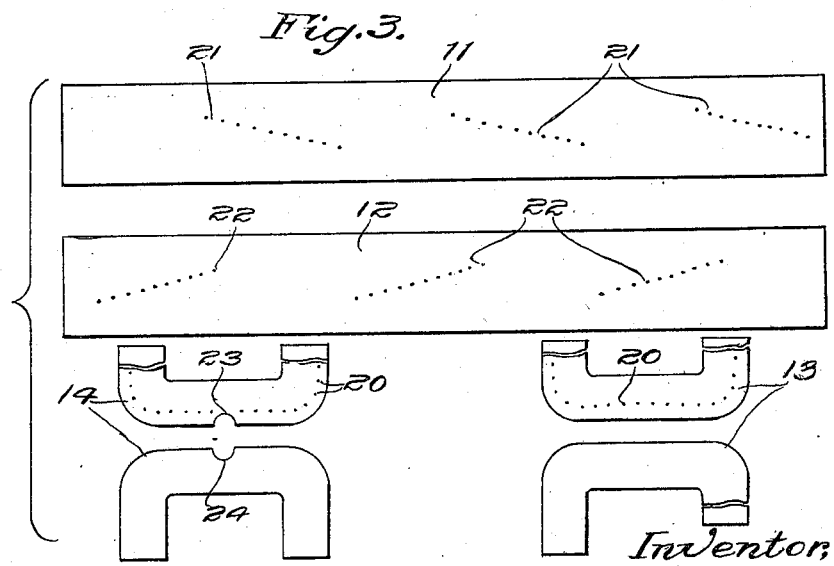
Witnesses:—
C. J. Williams
M. Beulah Townsend
Inventor,
Henry L. Dietcher,
by James R. Townsend
his atty.
THE NORRIS PETERS CO., WASHINGTON, D. C.

UNITED STATES PATENT OFFICE.

HENRY LOUIS DIETCHER, OF LOS ANGELES, CALIFORNIA.

LAWN-SPRINKLER.

974,954.  Specification of Letters Patent.  Patented Nov. 8, 1910.

Application filed August 31, 1908. Serial No. 451,086.

*To all whom it may concern:*

Be it known that I, HENRY LOUIS DIETCHER, a citizen of the United States, residing at Los Angeles, in the county of Los Angeles and State of California, have invented a new and useful Lawn-Sprinkler, of which the following is a specification.

The object of this invention is to provide cheap, light, simple, superior means by which water may be sprinkled in regular form over the lawn with a great multitude of even, fine streams, and which can be moved over the lawn with great facility.

Another object is maximum strength for a given efficiency.

The accompanying drawings illustrate the invention.

Figure 1 is a perspective view of my new lawn-sprinkler ready for use. Fig. 2 is a plan of the same. Fig. 3 shows the blanks out of which the sprinkler-tube may be formed.

10 designates a continuous tube arranged in the form of a parallelogram formed of two side members 11, 12, and two end members 13, 14, the latter of which is provided with a nipple 15 provided with a union 16. The end members 13, 14, are each provided along the upper, outer portions with rows of perforations 20 which are punched into the blanks from which the members are formed.

The continuous tube 10 comprises the parallel side pieces 11 and 12 and the mating end pieces 13 and 14. The side-piece 11 has three rows of perforations 21 extending diagonally, and the side-piece 12 has three rows of perforations 22 extending diagonally in a reverse direction; the perforations 22 being staggered to overlap the ends of the perforations 21, as clearly shown in Fig. 3. The perforations are formed in the blanks before the blanks are shaped up to form the tube.

The side-piece 11 is formed of a single blank of sheet-metal rolled into a tube and having its edges soldered together, and the side-piece 12 is constructed in a similar manner. The end-piece 13 is formed of two mating blanks soldered together to produce an integral double elbow, and the ends of the double elbow are inserted into the ends of the side-pieces 11 and 12 and soldered. A row of perforations 20 is formed in one of the blanks.

The end-piece 14 is exactly similar to the end-piece 13 with the exception that semicircular notches 23 and 24 are formed at the centers of the blanks so that when the blanks are pressed and soldered together an opening is produced leading into the tube, and the nipple 15 is soldered around the opening to form an inlet for the sprinkler, there being a union 16 upon the outer end of the nipple to attach the hose 25 to the nipple.

The end-piece 14 is in the form of a double elbow, and the ends of the elbow are inserted into the ends of the side-pieces 11 and 12, and soldered. The end-piece 14 has perforations 20 corresponding to the perforations in the end-piece 13.

The runners 26 and 27 are formed of pieces of strap iron, and the ends of the runners are curved upwardly to form the posts which are soldered to the side pieces 11 and 12 so that the device may be drawn from place to place over the lawn and carried upon the runners, the runners sliding freely over the ground.

The tube 10 is in the form of a parallelogram. The perforations 20, 21 and 22 are preferably formed with a sharp-pointed punch so that the perforations may be very fine, and the blanks may be made of thin sheet metal or galvanized iron. The arrangement of the perforations and their several directions will spread a fine spray of water evenly over a large area, and the device is easily moved from place to place.

The tube is preferably cylindrical in cross-section.

The perforations of the long sides extend diagonally of the top of such sides so as to direct the water in criss-cross sprays over and sidewise from the sprinkler, and the perforations of the short sides extend lengthwise of such sides at the upper outside portions thereof so as to direct sprays outwardly and upwardly from such sides. In this way the sprays are made to thoroughly and evenly cover the entire area of a parallelogram.

The sprinkler on the comparatively short runners under the longer sides of the sprinkler is readily drawn over the ground by the hose 25 without liability of upsetting or tilting.

The runners are set closer to the end of the sprinkler to which the hose is attached than to the other end so that the portion of the sprinkler tube that projects at such other end of the runners will counterbalance the weight of the attached hose to prevent tilting.

I claim:—

1. A lawn-sprinkler comprising a tubular parallelogram consisting of two long sides and two short sides, said sides being perforated, the two long sides being each formed of a single piece of sheet metal rolled into a tube and soldered, and the two short sides being each formed of two pieces of sheet metal stamped and curved and soldered to form double elbows, the ends of the elbows being soldered to the two long sides, and the two long sides being perforated on diagonal lines.

2. A lawn sprinkler comprising a tubular perforated parallelogram consisting of two long sides and two short sides, the two long sides being each formed of a single piece of sheet metal rolled into a tube and soldered, and the two short sides being each formed of two pieces of sheet metal stamped and curved and soldered to form double elbows, the ends of the elbows being soldered to the two long sides, and a nipple soldered to one of the short sides and adapted to be connected to a source of water supply.

3. A lawn sprinkler comprising a tubular perforated parallelogram consisting of two long sides and two short sides, the two long sides being each formed of a single piece of sheet metal rolled into a tube and soldered, and the two short sides being each formed of two pieces of sheet metal stamped and curved and soldered to form double elbows, the ends of the elbows being soldered to the two long sides, a nipple secured to one of the sides and adapted to be attached to a source of water supply, and runners secured to the two long sides for supporting the parallelogram.

In testimony whereof, I have hereunto set my hand at Los Angeles, California, this 22d day of August, 1908.

HENRY LOUIS DIETCHER.

In presence of—
JAMES R. TOWNSEND,
M. BEULAH TOWNSEND.